(12) United States Patent
Shockley

(10) Patent No.: US 11,420,696 B2
(45) Date of Patent: Aug. 23, 2022

(54) VERTICALLY STOWABLE TRAILER

(71) Applicant: Troy Shockley, Greenville, SC (US)

(72) Inventor: Troy Shockley, Greenville, SC (US)

( * ) Notice: Subject to any disclaimer, the term of this patent is extended or adjusted under 35 U.S.C. 154(b) by 205 days.

(21) Appl. No.: 17/007,803

(22) Filed: Aug. 31, 2020

(65) Prior Publication Data
US 2022/0063742 A1    Mar. 3, 2022

(51) Int. Cl.
*B62D 63/08* (2006.01)
*B62D 63/06* (2006.01)
*B60B 33/00* (2006.01)

(52) U.S. Cl.
CPC .......... *B62D 63/08* (2013.01); *B60B 33/0021* (2013.01); *B60B 33/0026* (2013.01); *B62D 63/061* (2013.01); *B62D 63/068* (2013.01)

(58) Field of Classification Search
CPC .... B62D 63/08; B62D 63/061; B62D 63/068; B60B 33/0021; B60B 33/0026
See application file for complete search history.

(56) References Cited

U.S. PATENT DOCUMENTS

| | | | |
|---|---|---|---|
| 2,792,270 A | 5/1957 | Anderson | |
| 4,372,568 A * | 2/1983 | Campbell | B62D 63/064 280/204 |
| 4,480,851 A * | 11/1984 | St-Pierre | B62D 63/061 180/209 |
| 4,529,220 A | 7/1985 | Wright et al. | |
| 5,340,145 A * | 8/1994 | Leib | B62D 63/061 280/491.1 |
| 5,570,898 A * | 11/1996 | Albert | B60P 3/07 280/789 |
| 5,924,836 A * | 7/1999 | Kelly | B62D 63/061 414/537 |
| 6,955,375 B2 * | 10/2005 | Thurm | B60P 3/122 280/789 |
| 7,258,362 B2 * | 8/2007 | Thurm | B62D 63/061 280/491.1 |
| D574,755 S * | 8/2008 | Thurm | D12/101 |
| 7,540,528 B2 * | 6/2009 | Spainhower | B62D 63/062 280/415.1 |
| 8,360,462 B2 * | 1/2013 | Mayfield | B62D 63/061 280/491.1 |
| 8,696,012 B2 * | 4/2014 | Oyasaeter | B62D 63/061 280/491.4 |
| 9,056,639 B2 * | 6/2015 | Bank | B62D 63/061 |

(Continued)

*Primary Examiner* — Jacob B Meyer
(74) *Attorney, Agent, or Firm* — Southeast IP Group LLC; Thomas L. Moses

(57) ABSTRACT

A trailer includes a set of removable castor wheels attached to a rear portion thereof, wherein the castor wheels are oriented to face rearwardly when the trailer is oriented in the traditional horizontal position. This arrangement allows the trailer to be tilted upwardly into a vertical orientation so that it rests on the castor wheels, thus providing an apparatus and method for easily moving and storing trailers more efficiently due to the reduced footprint required for such trailer storage. The castor wheels, in one embodiment, include mounting brackets that may be attached to the trailer using a securing rod, similarly to the mounting mechanisms commonly used for removably attaching trailer hitches into trailer hitch sleeves, thus rendering the castor wheels removable from the trailer when they are not in use for storage purposes.

10 Claims, 6 Drawing Sheets

(56) References Cited

U.S. PATENT DOCUMENTS

| | | | |
|---|---|---|---|
| 10,752,306 B2* | 8/2020 | Nordstrom | B62D 53/062 |
| 2005/0104323 A1* | 5/2005 | Thurm | B60P 3/07 |
| | | | 280/491.1 |
| 2006/0279071 A1* | 12/2006 | Spainhower | B62D 63/061 |
| | | | 280/656 |
| 2007/0001432 A1* | 1/2007 | Thurm | B62D 63/062 |
| | | | 280/656 |
| 2010/0038883 A1 | 2/2010 | Thedford et al. | |
| 2011/0221168 A1* | 9/2011 | Alexander | B62D 63/061 |
| | | | 280/639 |
| 2014/0312593 A1* | 10/2014 | Bank | B62D 63/061 |
| | | | 280/400 |
| 2022/0063742 A1* | 3/2022 | Shockley | B62D 63/062 |

* cited by examiner

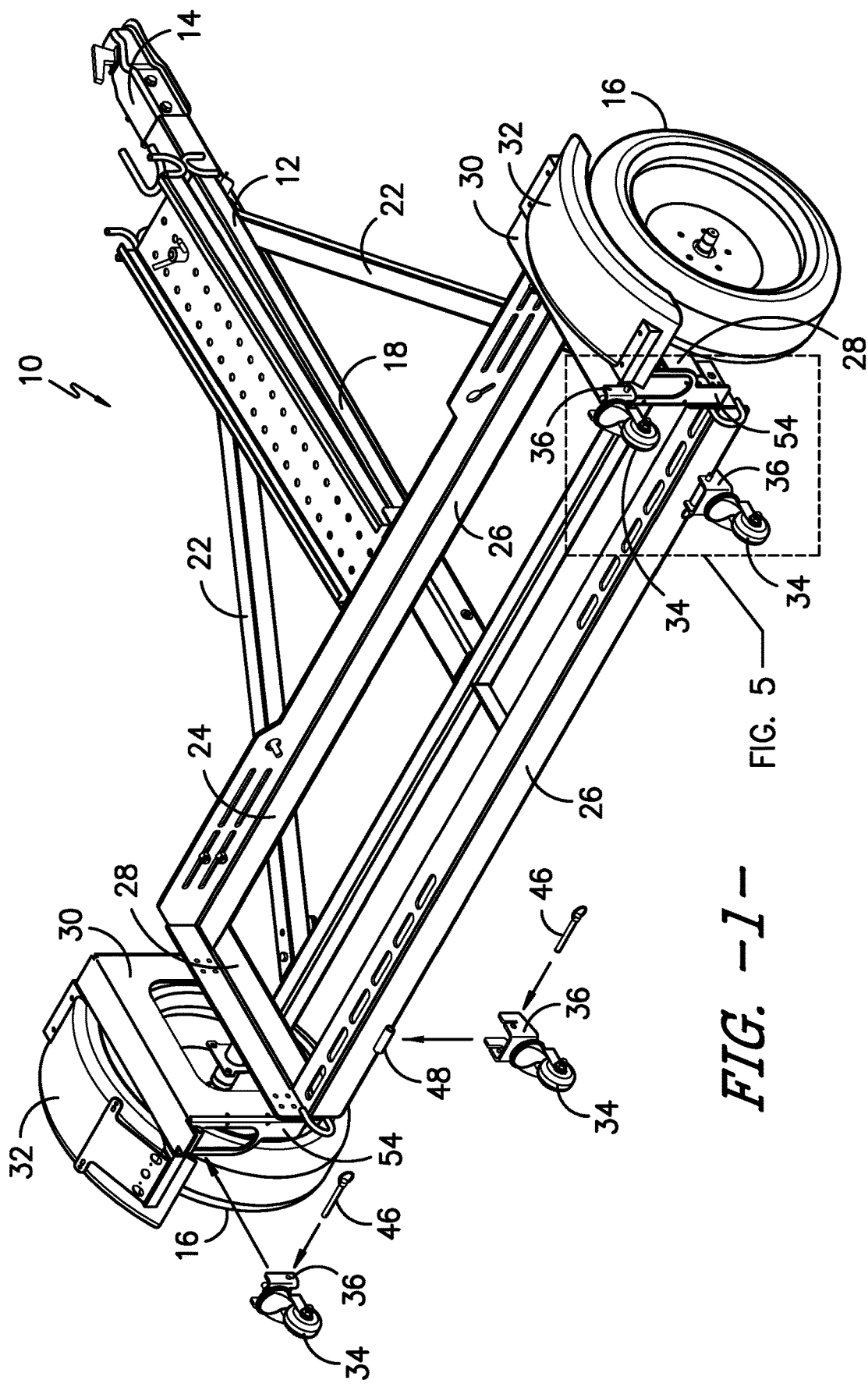
FIG. -1-

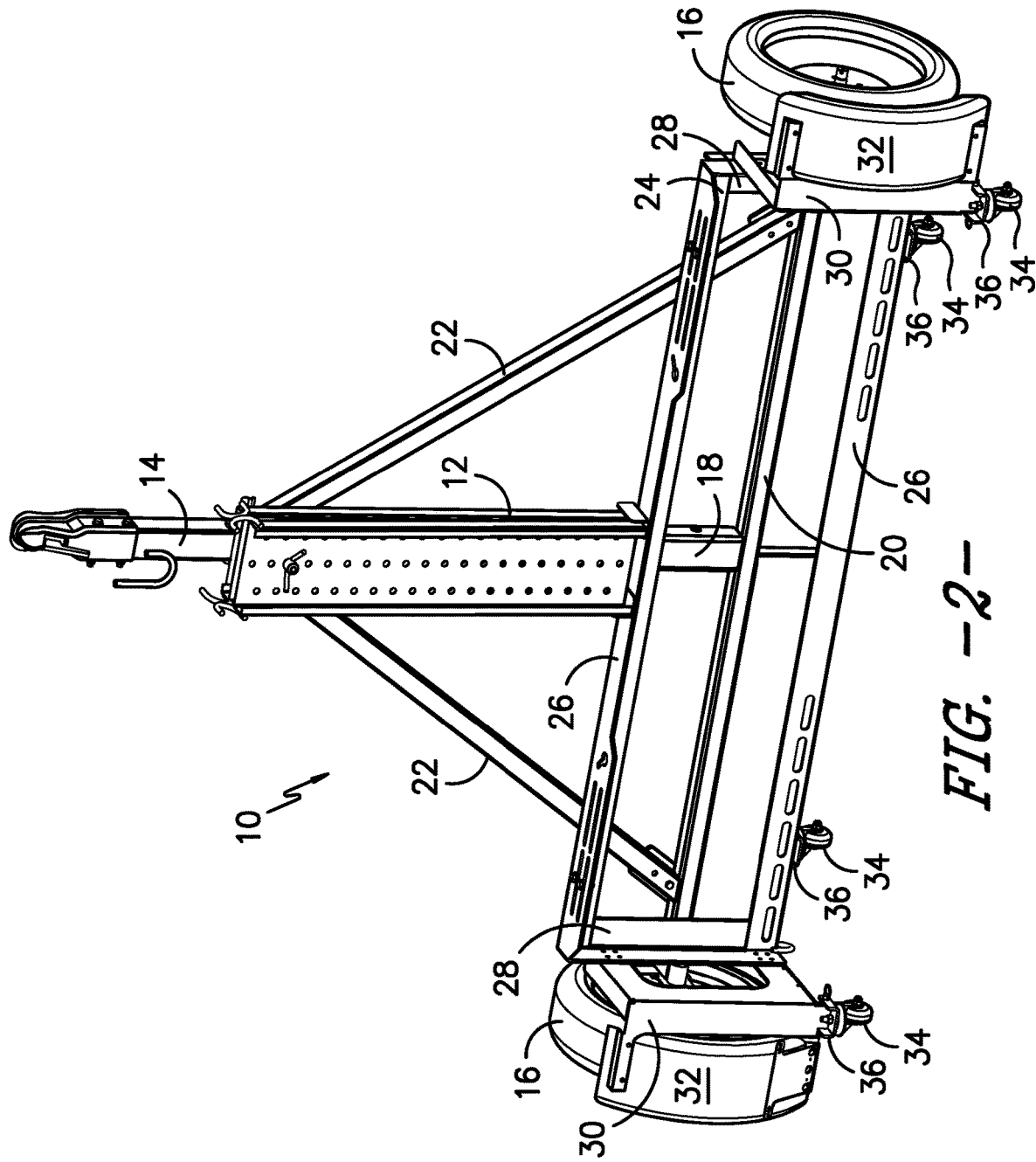

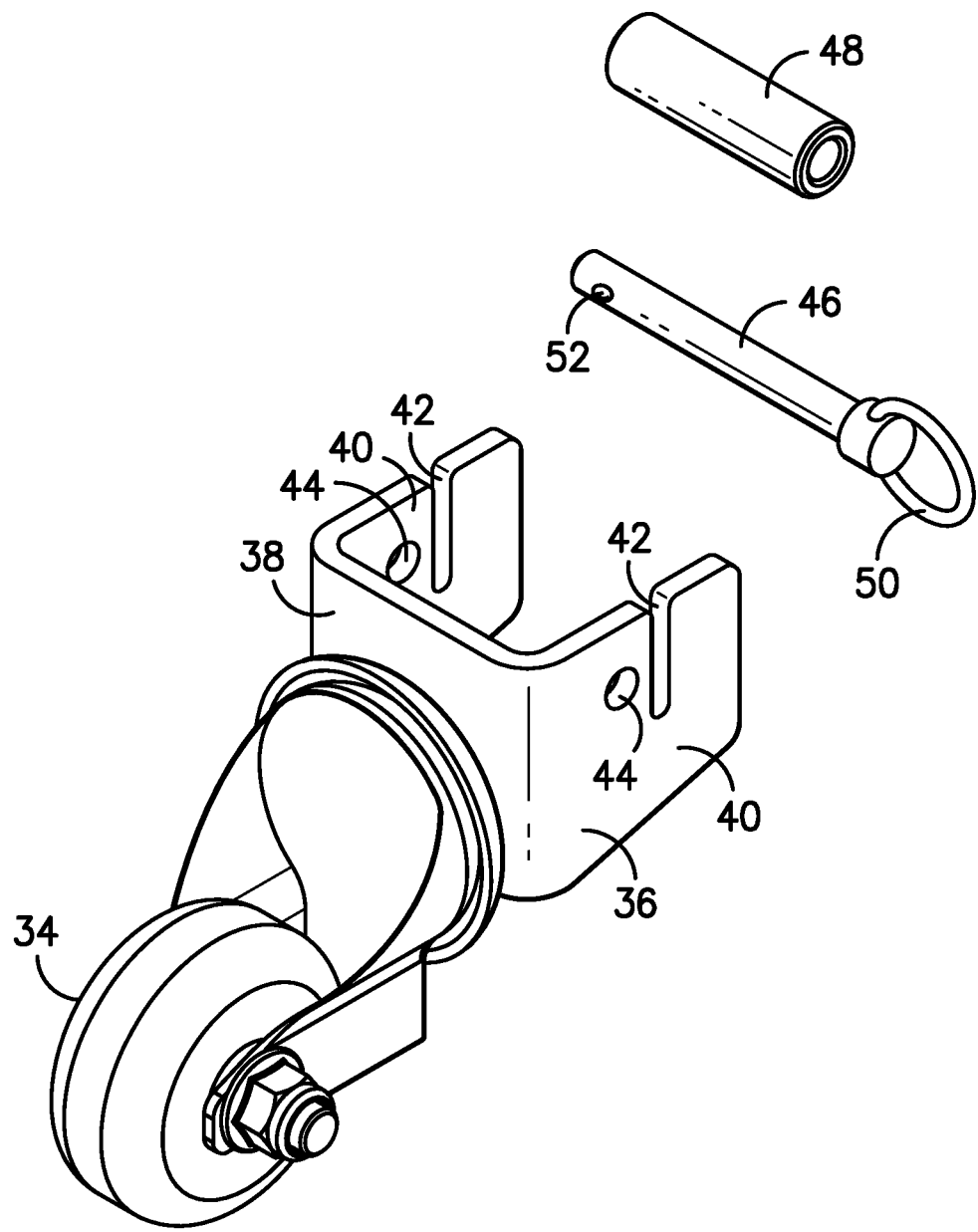
FIG. -3-

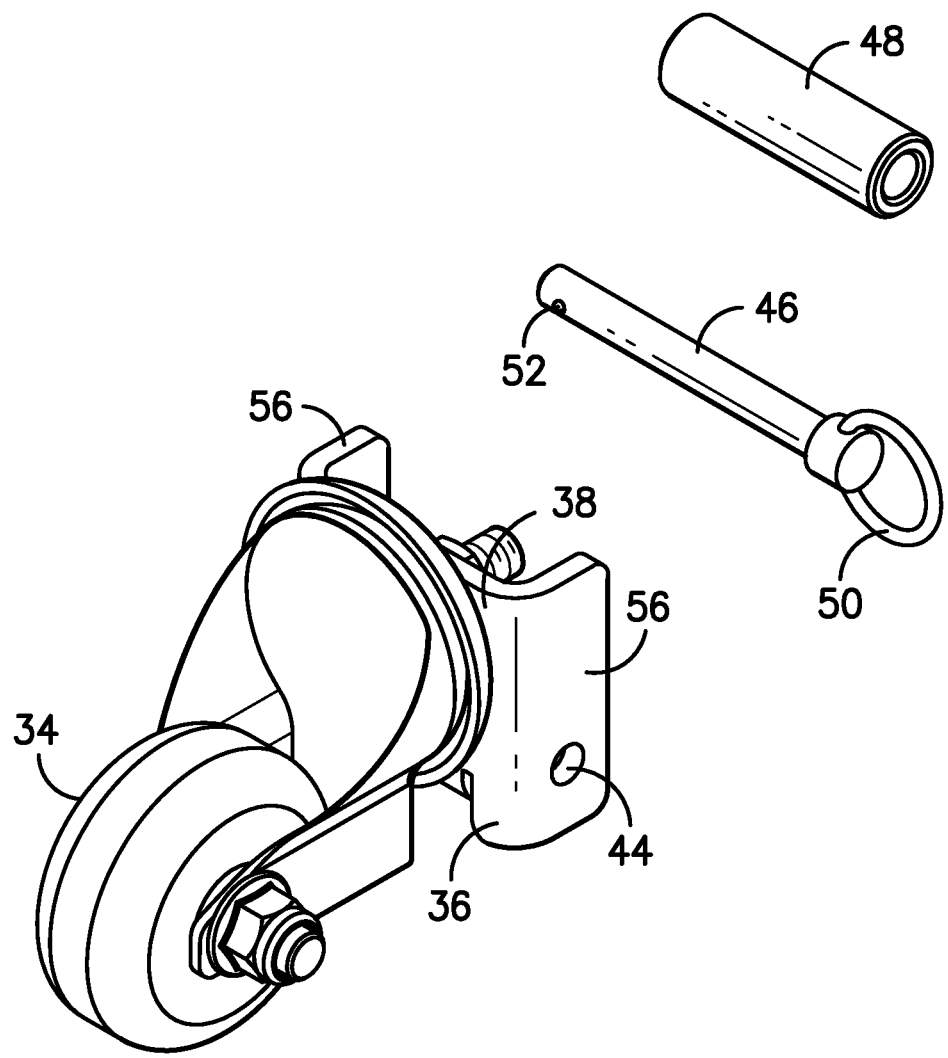
FIG. -4-

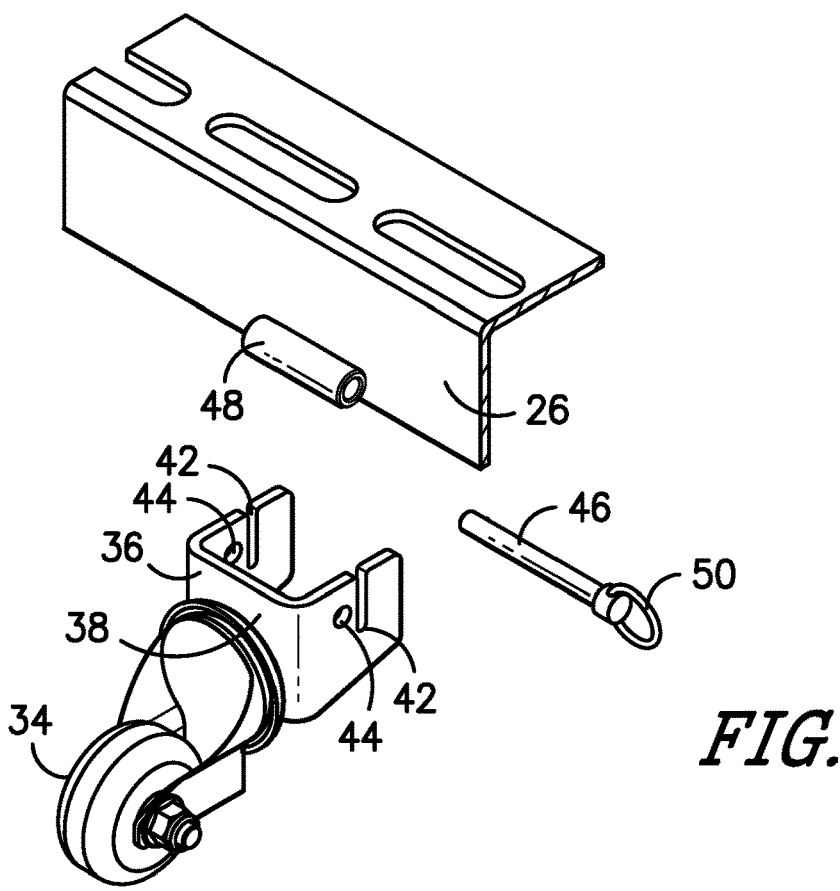
FIG. -5-
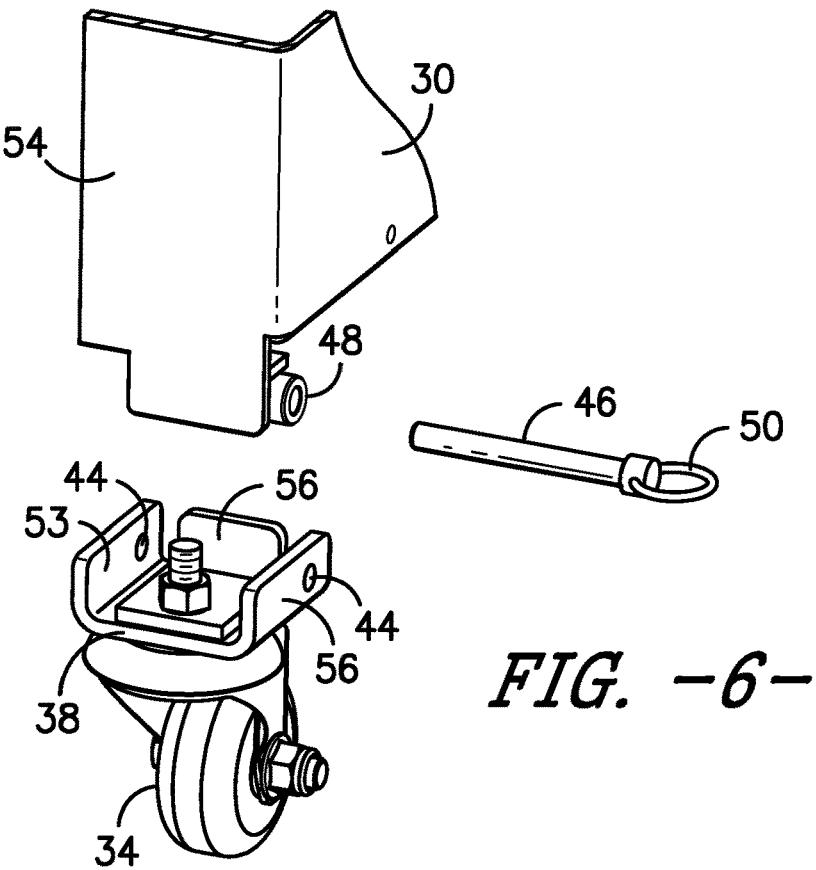
FIG. -6-

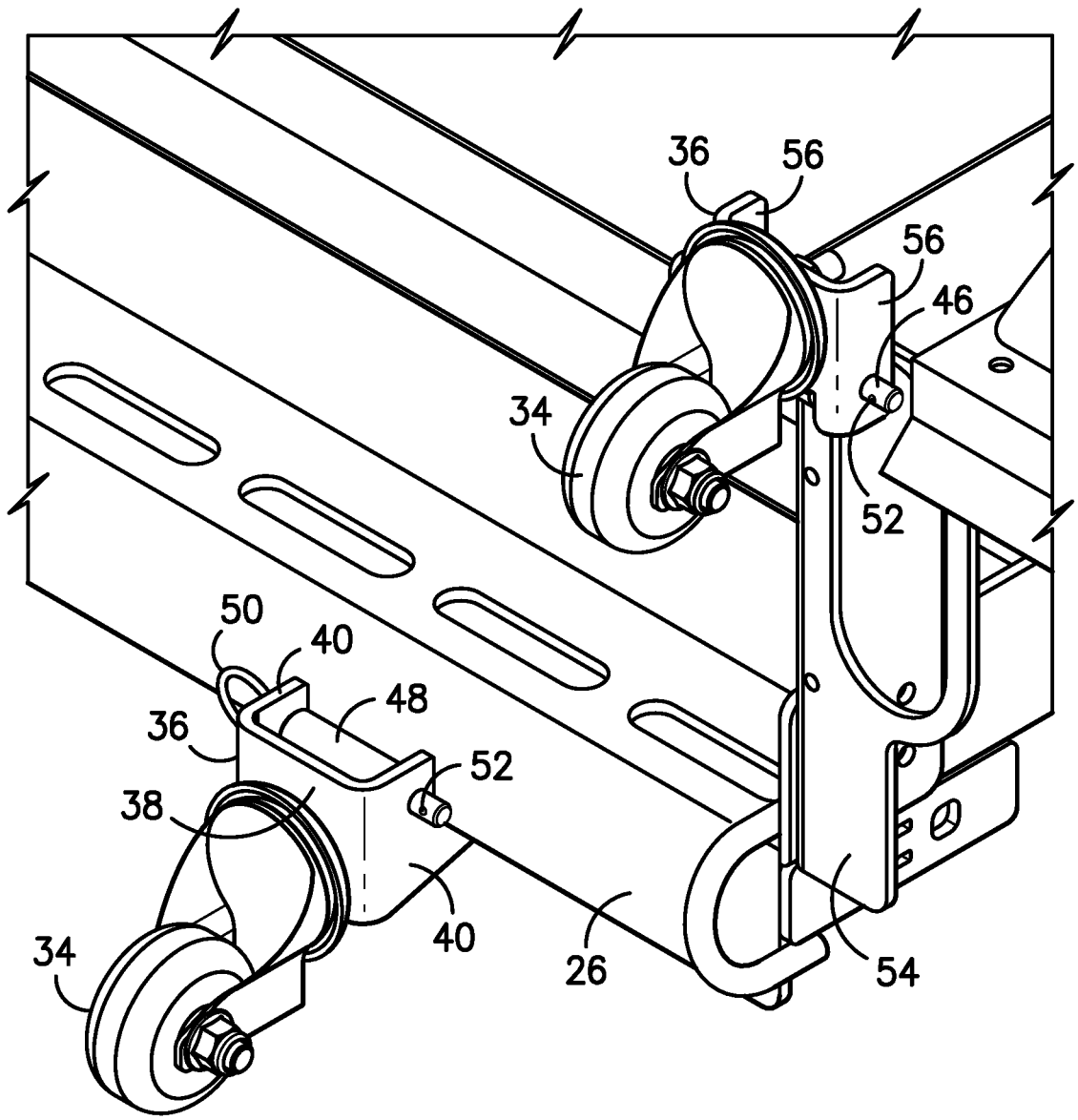
FIG. -7-

VERTICALLY STOWABLE TRAILER

BACKGROUND OF THE INVENTION

The present invention relates generally to trailers having the capability of being stored in an upright, vertical orientation. More specifically, the present invention includes a trailer having a set of castor wheels removably attached to a rear portion thereof, so that the trailer may be tilted upwardly for storage in a vertical position, wherein the castor wheels allow the trailer to be moved around a garage, storage area, or the like, while the trailer is vertically oriented. This configuration is particularly useful for trailers having a shorter length, such as motorcycle trailers, but it should be understood that the concepts disclosed herein may be applied to any suitable type of trailer.

Heretofore, many efforts have been made to make trailers more easily stowable, so that they take up less space in a storage position than they do while in a normal, horizontally oriented position. Some examples are set forth hereinbelow, and each of the following references are incorporated herein by reference, in their entireties:

U.S. Pat. No. 4,480,851—Stowable Trailer

This stowable trailer is arranged to take little floor space for stowage while avoiding recourse to a collapsible frame with its inherent disadvantages. This stowable trailer comprises a rigid frame, a pair of stowage wheels attached on one side of the frame to roll the trailer on them while it stands upright on that side. The trailer is provided with road wheel units which are pivotally retractable, so as not to project from the bottom of the trailer in their stowed-away position, and with handles to help rolling the trailer on the stowage wheels.

U.S. Pat. No. 4,529,220—Trailers

A trailer comprising a load bearing section, a wheel carrying assembly and a draw bar. The load bearing section and the wheel carrying assembly are relatively displaceable between a conventional towing position (FIG. 1, FIG. 5) and a position in which the wheel carrying assembly supports the trailer in a substantially vertical disposition (FIG. 3, FIG. 7) for stowage.

U.S. Pat. No. 5,340,145—Collapsible Trailer

A collapsible trailer includes a first platform and a second platform which is pivotably mounted to the first platform so that the second platform may move between an open and closed position. A support arm is mounted on the first platform and extends to contact the second platform at a position substantially away from the pivot axis of the second platform when in the open position. The support arms shares a load applied to the second platform between the first platform and the second platform.

U.S. Pat. No. 5,924,836—Folding and Tilting Trailer

A trailer having a front section and rear section connected with hinges is disclosed. The front section of the trailer comprises a front bed section mounted to a front frame section having a tongue extending therefrom. The rear section of the trailer comprises a rear bed section mounted to a rear frame section resting on a wheeled axle. A first pair of hinges detachably connects the front and rear sections of the trailer at the top of upwardly extending sides of the bed sections. A second pair of hinges detachably connects the frame sections of the front and rear sections of the trailer below the bed. The rear section of the trailer may be rotated downwardly with respect to the front to form a ramp, or the front rotated over the rear to shorten the overall length of the trailer for storage.

U.S. Pat. No. 6,955,375—Vertically Stowable Modular Multi-purpose Trailer

A vertically stowable modular multi-purpose trailer is provided. The trailer includes a forward support section including a first tubular frame having a main body portion with a first upper platform and rear interface side, and forward trailer neck; a pair of caster wheels attached proximate said rear interface; and a first planar deck substantially covering the first upper platform. The trailer further includes a rear support section including a second tubular frame having a second upper platform and a forward interface; and a second planar deck substantially covering the second upper platform. A pair of hinge assemblies interconnecting rear interface and said forward interface. The trailer is adapted to be configured in a deployed configuration, wherein the forward support section and rear support section are longitudinally positioned next to each other forming a generally horizontally oriented common planar platform for supporting a payload. The trailer is further adapted to be configured in a vertically stowed configuration, wherein the forward support section and rear support section are adapted to be folded about the pair of hinge assemblies such that the forward support section and rear support section are laterally positioned next to each other in a generally vertical orientation.

U.S. Pat. No. 7,258,362—Vertically Stowable Modular Multi-purpose Trailer

A vertically stowable modular multi-purpose trailer is provided. The trailer includes a forward support section including a first tubular frame having a main body portion with a first upper platform and rear interface side, and forward trailer neck; a pair of caster wheels attached proximate said rear interface; and a first planar deck substantially covering the first upper platform. The trailer further includes a rear support section including a second tubular frame having a second upper platform and a forward interface; and a second planar deck substantially covering the second upper platform. A pair of hinge assemblies interconnecting rear interface and said forward interface. The trailer is adapted to be configured in a deployed configuration, wherein the forward support section and rear support section are longitudinally positioned next to each other forming a generally horizontally oriented common planar platform for supporting a payload. The trailer is further adapted to be configured in a vertically stowed configuration, wherein the forward support section and rear support section are adapted to be folded about the pair of hinge assemblies such that the forward support section and rear support section are laterally positioned next to each other in a generally vertical orientation.

US Patent Application Publication No. 2006/0279071—Folding Trailer

A folding trailer may include a front deck and a rear deck that may be folded together into a compact configuration. The trailer may include a folding mechanism having a support base on opposing sides of the trailer. The support base may include one or more casters for supporting the trailer in a folded configuration and allowing the trailer to be easily moved. The folding mechanism may include a linkage structure which moves the support base into position when the trailer is folded and facilitate folding of the front and rear decks together.

US Patent Application Publication No. 2010/0038883—Drive-on Multipurpose Trailer Configurable for Semi-Vertical Storage A multi-purpose trailer provides further utility by being easily configurable in a carrying orientation, a drive-on loading orientation, and a storage orientation. The storage orientation is capable of near vertical storage, thus taking up very limited amounts of floor space in a garage or storage area. The drive-on loading orientation provides a ramped portion which easily accommodates the loading of wheeled vehicles without the need for additional ramp components or members. Further, mechanisms are provided to easily adjust between the various orientations including hydraulically lifting from a loading orientation to a transport orientation. To provide additional utility, provisions are made on the trailer surface for the attachment of multiple modular accessories.

BRIEF SUMMARY OF THE INVENTION

In accordance with one aspect of the invention, a first embodiment of a vertically stowable trailer includes a frame member having a tongue on a front end thereof for attachment to a vehicle trailer hitch. A pair of wheels are disposed on opposed sides of the trailer for use in transport when the trailer is attached to a vehicle. The frame also includes a longitudinal support member extending from the tongue rearwardly to a lateral support member. A pair of diagonal supports extend between the lateral support member adjacent the wheel and the longitudinal support member. A rectangular frame section is carried between the wheels by the longitudinal support member, the lateral support member and the diagonal supports. Vertically oriented wheel housings are positioned on either side of the rectangular frame section between the rectangular frame section and the wheel, and a fender is attached to each wheel housing so that each fender is positioned above its respective wheel.

Removable castor wheels may be removably attached to the rear portion of the rectangular frame section and the rear portions of the wheel housings so that the castor wheels extend in a rearward direction. This arrangement allows the trailer to be tilted upwardly to a vertical orientation, so that the trailer rests on the castor wheels. In this way, the trailer may be easily stored and moved while oriented in a vertical direction, which allows the trailer to be stored while taking less floor space. Thus, the footprint of the trailer is much smaller when the trailer is resting on the castor wheels in a vertical orientation, and more trailers may be stored in a defined space than would be possible if the trailers were stored in a traditional horizontal orientation.

The castor wheels each include a mounting bracket that may be removably attached to the trailer, and the mounting brackets may differ slightly from one another, depending on whether the particular castor wheel is to be attached to the wheel housing or to the rear portion of the rectangular frame member. In a preferred embodiment, the castor wheel mounting brackets may be removably attached to the trailer by using pins having a spring-loaded ballbearing, a rod having a linchpin, or the like, so that additional tools are not required for attaching and/or removing the castor wheels from the trailer.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of a vertically stowable trailer disposed in a horizontal position, and further having attachable castor wheels affixed on a rear portion thereof, so that the trailer may be tilted upwardly to rest on the castor wheels in a vertical orientation for storage and maneuvering within a storage area;

FIG. 2 is a perspective view of the vertically stowable trailer shown in FIG. 1, wherein the trailer is disposed in a vertical position and resting on the removable castor wheels for storage and maneuvering within a storage area;

FIG. 3 is a perspective, exploded view of a castor wheel having a bracket, a sleeve member and a securing rod having securing means for securing the castor wheel bracket to the sleeve member;

FIG. 4 is a perspective, exploded view of a castor wheel having a different type of bracket than that shown in FIG. 3, a sleeve member and a securing rod having securing means for securing the castor wheel bracket to the sleeve member;

FIG. 5 is an inset, exploded perspective view of one of the castor wheel assemblies, as shown in FIG. 1;

FIG. 6 is another inset, exploded perspective view of one of the castor wheel assemblies, as shown in FIG. 1; and FIG. 7 is an inset perspective view of two castor wheel assemblies as attached to the trailer, as shown in FIG. 1.

DETAILED DESCRIPTION OF THE INVENTION

The present invention includes, in a first embodiment, a vertically stowable trailer 10 includes a frame member 12 having a tongue 14 on a front end thereof for attachment to a vehicle trailer hitch, as shown in FIGS. 1 and 2. A pair of wheels 16 are disposed on opposed sides of the trailer 10 for use in transport when the trailer 10 is attached to a vehicle. The frame member 12 also includes a longitudinal support member 18 extending from the tongue 14 rearwardly to a lateral support member 20. A pair of diagonal supports 22 extend between the lateral support member 20 adjacent the wheel 16 and the longitudinal support member 18. A rectangular frame section 24 is carried between the wheels 16 by the longitudinal support member 18, the lateral support member 20 and the diagonal supports 22, and includes a pair of cross members 26 extending laterally between the wheels 16 and a pair of side members 28 connected to the cross members 26, forming the rectangular frame section 24. Vertically oriented wheel housings 30 are attached to outside of the side members 28 of the rectangular frame section 24. The wheel housings 30 are positioned between the rectangular frame section 24 and the wheel 16 on each side of the trailer 10, and a fender 32 is attached to each wheel housing 30 so that each fender 32 is positioned above its respective wheel 16.

A first pair of castor wheels 34 are removably attached to the rear cross member 26 of the rectangular frame section 24, spaced apart so that each castor wheel 34 is adjacent the larger trailer wheel 16 on each side of the trailer 10, as shown in FIGS. 1-2. A second pair of castor wheels 34 are removably attached to a rear portion of each vertically oriented wheel housing 30, preferably at or near the top of the wheel housing 30, as shown. All four of the castor wheels 34 are oriented so that the castor wheels 34 are facing rearwardly when the trailer 10 is oriented in a horizontal position, as shown in FIG. 1, so that the trailer 10 may be tilted upwardly into a vertical orientation and may rest on the castor wheels 34 in that position, as shown in FIG. 2. This arrangement allows the trailer 10 to be easily stored and moved while in a vertical orientation, thus taking up much less floor space in a garage, shed, parking lot or other storage facility or building.

In one embodiment, the first pair of castor wheels 34 include a mounting bracket 36 that is generally C-shaped, wherein the castor wheel is rotatably attached to a mounting plate 38, as shown in FIGS. 3, 5 and 7. A pair of support panels 40 extend perpendicularly from the mounting plate 38 on each side edge thereof, forming the C-shaped mounting bracket 36. The support panels 40 may include a slot 42 extending downwardly from the top portion thereof, and may further include a hole 44 for receiving a securing rod 46, such as a locking pin or linchpin. The rear cross member 26 of the rectangular frame section 24 is preferably formed into an L-shaped support, wherein the top side of the L-shaped support is oriented horizontally and the second side extends downwardly in a vertical orientation from the rear edge of the horizontal portion, as shown in FIG. 7. A sleeve member 48 is welded, or otherwise permanently attached, to the vertical portion of the rear cross member 26. To removably attach the castor wheel 34 to thereto, the castor wheel is placed so that the sleeve member 48 extends between the holes 44 in the mounting brackets 36 thereof, and the slots 42 of the mounting bracket 36 slide upwardly onto the vertical portion of the rear cross member 26. Once the castor wheel 34 is properly positioned as described, a securing rod 46 slides through the first hole 44 of the mounting bracket 36, through the sleeve member 48, and out through the second hole 44 of the mounting bracket 36, and is secured in that position. Securing means for maintaining the securing rod 46 to the trailer 10 may include a cotter pin, keyring mechanism or pivoting ring 50 that extends through a hole in the securing rod 46, a springloaded ballbearing 52 disposed on one or both ends of the securing rod 46, a combination of these mechanisms, or any other suitable mechanism(s) for temporarily securing the securing rod 46 in place to maintain the castor wheel 34 in its proper position with respect to the trailer 10. These types of securing mechanisms are commonly known and used for such purposes.

The second pair of castor wheels 34 are attachable to a vertically oriented, upper portion of the rear panel 54 of the wheel housing 30, as shown in FIGS. 1-2, and 7. These castor wheels 34 may include a slightly different mounting bracket 36, wherein the mounting plate may include three lips 56 that extend in perpendicular orientation from three edges of the mounting plate 38, wherein the lips 56 extend from the mounting plate 38 in a perpendicular orientation and direction away from the castor wheels 34, as shown in FIGS. 4 and 6. Two of the perpendicular lips 56 are on opposed sides of the mounting plate 38 from one another, and these two opposed lips 56 may define holes 44 for receiving the same type of securing rod 46 as described above.

To remove the castor wheels 34 from the trailer 10 when not in use, a user simply removes or disengages the locking mechanism of the securing rod 46, and slides the securing rod 46 out of the bracket holes 44 and the sleeve member 48. In one particularly useful arrangement, the securing rod includes a hole on one end for receiving a pivoting ring mechanism 50, and further includes a springloaded ballbearing 52 at the other end thereof, wherein the springloaded ballbearing 52 is biased to extend outwardly from the side of the securing rod 46, as shown in FIGS. 3-6. Pulling the ring 50 causes the ballbearing 52 to be pushed inwardly when it engages the holes 44 and sleeve member 48 to allow the securing rod 46 to pass through the holes 44 and the sleeve member 48, but then pops back outwardly due to the spring pushing it from within after the securing rod 46 has been removed from the bracket holes 44 and sleeve member 48. This arrangement allows a user to simply grasp the ring 50 and pull the securing rod 46 back out from the holes 44 and sleeve member 48, which forces the ballbearing 52 inwardly to allow passage of the securing rod 46 therethrough.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A vertically stowable trailer comprising:
a frame having a tongue on a front end thereof for attachment to a vehicle trailer hitch, a pair of wheels attached to said frame member on opposed lateral sides thereof, and a rectangular frame section having laterally oriented front and rear cross members and a pair of longitudinally oriented side members connected to said front and rear cross members;
said frame further including a vertically oriented wheel housing on each side thereof, wherein each said wheel housing is disposed between one of said wheels and one of said side members of said rectangular frame section;
a first pair of castor wheels attached to said rear cross member so that said castor wheels are oriented to face rearwardly when said trailer is oriented in a horizontal position; and
a second pair of castor wheels, wherein each of said second pair of castor wheels is attached to a rear portion of said wheel housing so that said castor wheels are oriented to face rearwardly when said trailer is oriented in a horizontal position.

2. The vertically stowable trailer set forth in claim 1, wherein said castor wheels are removable from said trailer.

3. The vertically stowable trailer set forth in claim 2, wherein said castor wheels include a generally C-shaped mounting bracket having a mounting plate and a pair of pair of support panels extending perpendicularly from opposed edges of said mounting plate, and wherein said castor wheels are pivotally attached to said mounting plate.

4. The vertically stowable trailer set forth in claim 3, wherein each said support panel of said castor wheel mounting bracket defines a vertical slot for engaging a vertical portion of said rear cross member.

5. The vertically stowable trailer set forth in claim 4, wherein each said support panel of said castor wheel defines a hole for receiving a securing pin.

6. The vertically stowable trailer set forth in claim 5, wherein said rear cross member of said rectangular frame section includes a sleeve member for engaging said holes defined in said castor wheel mounting bracket support panels.

7. The vertically stowable trailer set forth in claim 6, further including a securing rod that slides through said holes in said castor wheel mounting brackets and also slides through said sleeve member to removably attach said castor wheels to said trailer.

8. The vertically stowable trailer set forth in claim 7, wherein said securing rod includes a securing mechanism for preventing said securing rod from accidentally sliding out of said castor wheel mounting bracket holes and said sleeve member.

9. The vertically stowable trailer set forth in claim 8, wherein said securing mechanism is selected from the group consisting of a cotter pin, a spring loaded ballbearing, a keyring mechanism, and any combination thereof.

10. The vertically stowable trailer set forth in claim 1, wherein said castor wheels include a mounting bracket including a mounting plate and perpendicularly oriented lips extending from at least two opposed edges of said mounting plate;

wherein each said lip defines a hole for receiving a securing rod.

* * * * *